United States Patent [19]
Mills

[11] Patent Number: 5,476,585
[45] Date of Patent: Dec. 19, 1995

[54] REMOVABLY MOUNTED HOLLOW FILTER ELEMENT AND CORE

[75] Inventor: Steven L. Mills, Cortland, N.Y.

[73] Assignee: Pall Corporation, East Hills, N.Y.

[21] Appl. No.: 21,850

[22] Filed: Feb. 24, 1993

[51] Int. Cl.⁶ .................................. B01D 27/08
[52] U.S. Cl. .................. 210/232; 210/450; 210/451; 210/457; 210/489; 210/497.2; 55/500; 55/502
[58] Field of Search ................... 210/232, 238, 210/440, 443, 444, 497.01, 497.1, 493.1, 493.5, 493.2, 450, 451, 457, 488, 489, 497.2; 55/379, 392, 492, 502, 503

[56] References Cited

U.S. PATENT DOCUMENTS

| | | |
|---|---|---|
| Re. 29,447 | 10/1977 | Farrow et al. . |
| 930,401 | 8/1909 | Monteagle . |
| 1,669,461 | 5/1928 | Gamble . |
| 2,064,511 | 12/1936 | Wells . |
| 2,401,222 | 5/1946 | Briggs . |
| 2,420,414 | 5/1947 | Briggs . |
| 3,189,179 | 6/1965 | McMichael . |
| 3,261,473 | 7/1966 | Riede . |
| 3,306,794 | 2/1967 | Humbert, Jr. . |
| 3,308,956 | 3/1967 | Yee et al. . |
| 3,386,583 | 6/1968 | Merten . |
| 3,417,870 | 12/1968 | Bray . |
| 3,486,626 | 12/1969 | Close . |
| 3,520,417 | 7/1970 | Durr et al. . |
| 3,539,049 | 11/1970 | D'Eustachio et al. . |
| 3,578,175 | 5/1971 | Manjikian . |
| 3,767,054 | 10/1973 | Farrow et al. . |
| 3,850,813 | 11/1974 | Pall et al. . |
| 4,101,423 | 7/1978 | Merrill et al. . |
| 4,169,793 | 10/1979 | Lockshaw . |
| 4,186,099 | 1/1980 | Henschel, Jr. et al. . |
| 4,211,543 | 7/1980 | Tokar et al. . |
| 4,214,612 | 7/1980 | de Putter . |
| 4,218,324 | 8/1980 | Hartmann et al. . |
| 4,402,830 | 9/1983 | Pall .......................... 210/457 |
| 4,419,234 | 12/1983 | Miller et al. . |
| 4,660,779 | 4/1987 | Nemesi et al. . |
| 4,686,038 | 8/1987 | Arnaud . |
| 4,783,271 | 11/1988 | Silverwater . |
| 4,839,037 | 6/1989 | Bertelson et al. ............ 210/497.1 |
| 4,882,056 | 11/1989 | Degen et al. ................ 210/497.1 |
| 4,948,503 | 8/1990 | Baumann et al. . |
| 5,006,242 | 4/1991 | Sato et al. . |
| 5,015,375 | 5/1991 | Fleck . |
| 5,028,323 | 7/1991 | Gould . |
| 5,096,575 | 3/1992 | Cosack . |
| 5,108,599 | 4/1992 | Lowery . |
| 5,114,572 | 5/1992 | Hunter et al. . |
| 5,130,023 | 7/1992 | Feint . |
| 5,252,207 | 10/1993 | Miller et al. ................ 210/335 |

FOREIGN PATENT DOCUMENTS

| | | |
|---|---|---|
| 0088148 | 3/1982 | European Pat. Off. . |
| 724242 | 7/1942 | Germany . |
| 3513062 | 10/1986 | Germany . |
| 53-2390 | 1/1978 | Japan . |
| 55-39279 | 3/1980 | Japan . |
| 55-34143 | 3/1980 | Japan . |
| 63-185423 | 8/1988 | Japan . |
| 1556713 | 5/1988 | U.S.S.R. . |
| 880469 | 10/1961 | United Kingdom . |

*Primary Examiner*—Robert A. Dawson
*Assistant Examiner*—W. L. Walker
*Attorney, Agent, or Firm*—Leydig, Voit & Mayer

[57] ABSTRACT

A filter assembly includes a disposable filter element and a reusable perforated supporting core, the filter element being removably mounted around the perforated core. The filter assembly may include first and second end caps and each end cap may include a first segment or adapter attached to one end of the filter element and a second segment or adapter attached to a corresponding end of the core. The first and second segments or adapters of each end may be detachably sealed to each other. The filter assembly may include a wrap having one or more strips wrapped at least once around the filter element.

89 Claims, 2 Drawing Sheets

REMOVABLY MOUNTED HOLLOW FILTER ELEMENT AND CORE

TECHNICAL FIELD

This invention relates to a filter assembly and, more particularly, a filter assembly with a disposable filter element and a reusable core for use in filtration. The invention has particular application in the filtration arts in that it significantly reduces the level of undesired solid wastes associated with the disposal of filter assemblies. The invention preserves filter cores for reuse notwithstanding the disposal of spent filter elements while satisfying rigorous performance criteria.

BACKGROUND OF THE INVENTION

A conventional filter assembly typically comprises a fully integrated tubular or cylindrical filter element and a cylindrical perforated core which are permanently affixed at their ends to end caps. In more detail, the filter element, which includes a filter medium, surrounds the rigid cylindrical core to establish a tubular or cylindrical configuration. Each of the axial ends of the core and the filter element are sealed to an end cap, which is formed as a unitary, one-piece structure. The end caps are secured to the core and the filter element by conventional attachment techniques, e.g., gluing, ultrasonic welding, fusion bonding, friction (spin) welding, etc. The particular method is selected based on the characteristics of the materials employed. The result is (1) a leak-proof seal between the end cap and the filter element to prevent bypass of unfiltered fluid and contamination the filtered fluid (filtrate) and (2) a filter element which is supported by the core against radially and axially directed forces.

In service, unfiltered fluid, e.g., a liquid or a gas, is directed through the filter element where the filter medium blocks, entrains, traps and/or otherwise removes particulates from the unfiltered fluid to provide a filtrate free of such particulates. Over time, the particulates foul the filter medium, which, in turn, causes an increased pressure differential (pressure drop) across the filter element. When the pressure drop becomes substantial, indicating significantly reduced flow rates, maintenance is required. Maintenance may take different forms. Most commonly, the filter assembly is removed, discarded, and replaced with a new filter assembly.

When disposing of the entire filter assembly, not only is the filter element discarded but also the filter core. However, the filter core merely serves to support the filter element and facilitate drainage rather than to remove particulates. It commonly is still viable and usable after the filter medium is fouled. Thus, discarding the filter core along with the filter element comprises unnecessary economic and environmental waste.

Recognizing the potential for reusing cores, some structures have been suggested to provide a reusable filter core with a replaceable filter element. Such structures usually provide for the replaceable filter element to be slipped onto the support core and clamped to the core with rings or other compression based appliances. Application of such appliances to the filter element compresses the underlying filter medium and results in disrupting uniform filtering characteristics and flow. Thus, the structural integrity and filtration performance of the filter element may be impaired. Furthermore, unless care is exercised, the filter medium can be damaged during the application of such hardware. If damaged, the filter element must be disposed of even prior to use.

For certain filtration situations, valve type structures for pressure relief, temperature sensitive flow control, filter by-pass, and the like, may be incorporated into an end cap assembly. Conventional reusable core type filter assemblies typically do not incorporate such valves and do not contemplate filter by-pass. In applications requiring continuous fluid flow through a filter element circulation is paramount. Thus, if the filter medium becomes fouled, inducing a significant pressure drop across the filter element, or some factor increases the back-pressure relative to the filter element, critical fluid flow may be disrupted in conventional reusable core type filter assemblies with potential for catastrophic failure.

DISCLOSURE OF THE INVENTION

It is an object of this invention to overcome the problems associated with conventional filter assemblies.

Another object of this invention is to provide a filter assembly having a reusable core assembly.

Another object of this invention is to forego disposal of a filter core when changing the filter element.

Still another object of this invention is to reduce the creation of solid waste associated with the disposal of spent filter assemblies.

A further object of this invention is to provide a filter assembly having a reusable core and a condition responsive mechanism associated with an end cap.

Accordingly, the present invention provides a filter assembly comprising a perforated core, a filter element and first and second end caps. The filter element is removably mounted around the perforated core. The first end cap includes a first segment attached to a first end of the filter element and a second segment attached to the first end of the core. The second end cap includes a first segment attached to the second end of the filter element and a second segment attached to the second end of the core. In accordance with one aspect of the invention, the first and second segments of each end cap are detachably sealed to each other. In accordance with another aspect of the invention, the first segment of at least one of the end caps is arranged to axially engage the second segment of the end cap.

The present invention also provides a filter assembly comprising a perforated core and a filter cartridge removably mounted around the perforated core. The filter cartridge includes a filter element and a wrap, the wrap including one or more strips wrapped at least once around the filter element.

The present invention further provides a method for mounting a filter cartridge to a reusable core assembly, the method comprising sliding the filter cartridge along the core assembly, axially engaging a first end cap segment at one end of the filter cartridge with a first end segment at one end of the core assembly, sealing the first end cap segment of the filter cartridge to the first end cap segment of the core assembly, and sealing a second end cap segment at the opposite end of the filter cartridge to a second end cap segment at the opposite end of the core assembly.

BEST MODE FOR CARRYING OUT THE INVENTION

Figure 1:
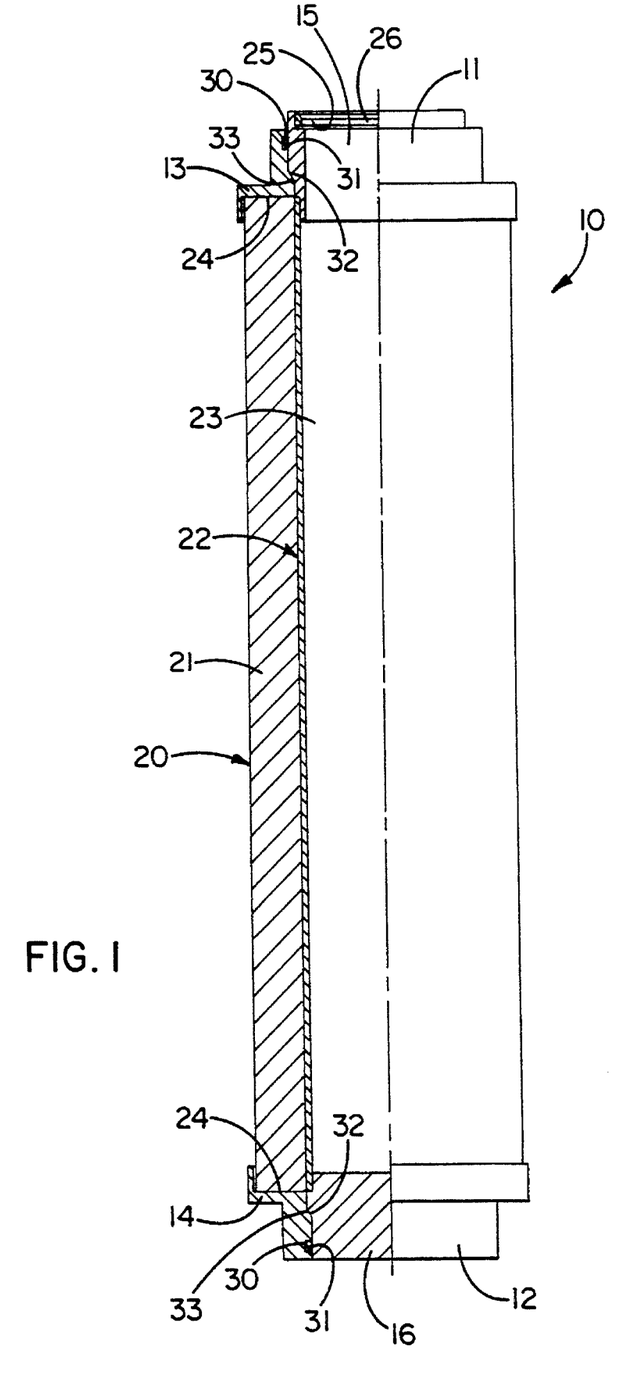
FIG. 1 is a partially sectioned elevation view of an embodiment of the invention.

In accordance with the illustrated embodiment of this invention, FIG. 1 depicts a cylindrical filter assembly 10 with segmented end caps 11,12. Although the segmented end caps may be variously configured, in the illustrated embodiment each end cap 11,12 comprises an outer adapter such as an outer annular end cap segment 13,14 and an inner adapter such as an inner end cap segment 15,16. The other major components of the filter assembly 10 comprise a filter cartridge 20, which includes the outer end cap segments 13,14 respectively attached to the ends of a filter element 21, and a cylindrical core assembly 22, which includes the inner end cap segments 15, 16 respectively attached to the ends of a perforated core 23.

A suitable filter element includes any filter medium used for fluid filtration including, for example, fibrous materials such as a mass of fibers, fibrous mats, woven or non-woven fibrous sheets, and fibrous depth filters; porous membranes such as supported or non-supported microporous membranes; porous foam; and porous metals or ceramics. The filter element may also include any associated support and/or drainage material. Further, the filter element may have any appropriately hollow configuration, such as a pleated or tubular cylinder.

The filter element 21 is secured to the outer end cap segments 13,14 in any suitable manner which prevents fluid bypass. For example, in the illustrated embodiment, the filter element 21 is composed of lofty, intertwined, and mechanically entangled fibers forming a cylindrical fibrous depth filter, such as the filter described in U.S. Pat. No. 4,726,901. The annular ends of the fibrous depth filter element 21 are disposed in cutouts 24 in the outer end cap segments 13,14 and are bonded to the segments 13,14, preferably non-compressively. For example, the ends of the filter element 21 may be bonded to the outer end cap segments 13,14 by a bonding agent such as an adhesive or a solvent. Alternatively, the filter element may be attached to the outer end cap segments by melt or fusion bonding, spin or sonic welding, potting, or in any other suitable manner.

The core 23 may be formed from any suitably rigid support material such as thermoplastic resin, stainless steel, etc. The core 23 serves to support the filter element 21 against radially inwardly directed forces and may also support the filter element 21 against axially directed forces. Consequently, the core 23 preferably has a configuration similar to the filter element and the outer diameter of the core corresponds to the inner diameter of the filter element. The upper and lower ends of the core 23 are respectively affixed to the inner end cap segments 15,16 by bonding, welding, fusing, or in any other suitable manner. The upper inner segment 15 may contain an opening to allow entry or discharge of the fluid. The opening in the upper inner segment 15 may be defined by an inner periphery which includes a groove 25 containing a seal such as an O-ring 26. The core assembly 22 may thus be removably sealed to a housing nipple (not shown) by slipping the inner end cap segment 15 over the nipple. Alternatively, the core assembly may be more permanently attached to the housing, such as by threading or welding the upper end cap segment to the housing. The lower inner segment 16 may be solid to block fluid flow. Alternatively, both inner segments 15,16 may contain an opening to allow entry or discharge of the fluid. Fluid is preferably directed outside-in through the filter assembly. However, fluid may alternatively be directed inside-out through the filter assembly.

The segmented end caps 11,12 as illustrated, are established by mating two separable adapters or segments, the outer segments 13,14 being characterized as filter element sealing segments and the inner segments 15,16 being characterized as core extension segments. The end cap segments may be composed of any appropriately impervious material, e.g., metal, ceramics, elastomers, or thermoplastics, and may be molded or machined to any appropriate configuration. Preferably, the end cap segments comprise a molded thermoplastic.

In accordance with one aspect of the invention, the segmented end caps provide adequate sealing of the filter assembly while also permitting reuse of the core assembly and removal of the filter cartridge for cleaning or replacement. To prevent bypass of the filter element, the outer and inner end cap segments of preferably both end caps are sealed to each other. In a preferred embodiment, the end cap segments are dimensioned so that the outer periphery of each inner end cap segment substantially conforms to the inner periphery of the corresponding outer end cap segment and a separate sealing member is provided around the corresponding peripheries of the end cap segments. As shown on FIG. 1, each annular outer endcap segment 13, 14 defines an opening and the corresponding inner end cap segment 15, 16 fits within the opening. The outer endcap segment 13, 14 is sealed to the corresponding inner endcap segment 15, 16 to prevent fluid bypass through the opening. For example, an O-ring 30 may be fitted in a groove 31 in the inner periphery of each outer end cap segment 13,14, the O-ring 30 engaging the outer periphery of the corresponding inner end cap segment 15,16. The O-ring 30 not only tightly seals the outer end cap segment 13,14 to the inner end cap segment 15,16, it may also provide a friction fit, or even a snap fit, which holds the filter cartridge 20 to the core assembly 22 after the filter cartridge 20 has been inserted onto the core assembly 22.

In accordance with another aspect of the invention, the filter cartridge and the core assembly are configured to transfer axial forces from the filter element to the core which typically has much more structural integrity than the filter element. This prevents the filter element from buckling and collapsing axially along the core. These axial forces may be due, for example, to imbalanced hydrostatic forces associated with fluid flowing through the filter assembly. In a preferred embodiment, the inner and outer end cap segments axially engage each other in an axial load-sharing manner which allows the core to support the filter element against axially as well as radially directed forces.

For example, the outer periphery of each inner end cap segment 15,16 may have a large diameter upper portion which tapers to a smaller diameter lower portion, defining a tapered shoulder 32 between the two portions. Similarly, the inner periphery of each outer end cap segment 13,14 may have a large diameter upper portion which tapers to smaller diameter lower portion, defining a tapered shoulder 33 between the two portions which corresponds to the tapered shoulder 34 of the corresponding inner end cap segment 15,16. With the corresponding shoulders 32,33 of the inner and outer end cap segments 13,15; 14,16 axially engaged, any forces acting on the filter element 21 axially upwardly in FIG. 1 are transferred from the filter element 21 to the core 23 via the end cap segments 13,14, 15,16. This prevents damage to the filter element 21, which might otherwise buckle under the axially upwardly directed forces. The axially engaged shoulders 32,33 also function as a stop preventing further upward movement of the filter cartridge 20 along the core assembly 22 and ensuring the proper positioning of the filter cartridge 20 on the core assembly 22. In this manner, the coacting, load-sharing inner and outer end cap segments properly position and prevent upwardly axial displacement of the filter cartridge with respect to the core assembly and transfer upwardly directed forces from the filter element to the core. A portion of the housing, such as the bottom of a filter bowl or a support plate (not shown), may be tightened against the lower end cap 12 to prevent downward movement of the filter assembly 10.

In the illustrated embodiment, the shoulders 32,33 of the end cap segments 13,14, 15,16 are tapered. Further, they are configured to prevent upwardly directed movement of the filter cartridge 20 on the core assembly 22 and to transfer from the filter element 21 to the core 23 upwardly directed forces, e.g., forces acting in the direction of flow outside-in through the core 23 or in the direction from the smaller diameter outer end cap segment 14 to the larger diameter outer end cap segment 13. Alternatively, the shoulders may have any other suitable configuration, e.g., they may be stepped rather than tapered. Further, the shoulders may be reversely configured to prevent downward movement of the filter cartridge 20 on the core assembly 22 and to transfer from the filter element 21 to the core 23 downwardly directed forces.

In a preferred mode of operation, the filter assembly 10 is removed from the housing (not shown) and the spent filter cartridge 20 is then removed from the reusable core assembly 22. Alternatively, the spent filter cartridge 20 may be removed from the core assembly 22 while the core assembly 22 is attached to the housing. To remove the filter cartridge 20 from the core assembly 22, the outer end cap segments 13,14 are urged downwardly along the core assembly 22, disengaging the shoulders 32,33 and sliding the O-rings 30 of the outer end cap segments 13,14 along the inner end cap segments 15,16 until they are free of the inner end cap segments 15,16. The filter cartridge 20 is then translated along the entire length of the core assembly 22 until it is free of the core assembly 22. Once the spent filter cartridge 20 is removed, a new filter cartridge 20 is translated over the core assembly 22 until the shoulders 32,33 of the end caps 11,12 are axially engaged and the O-rings 30 of the outer end cap segments 13,14 seal against the inner end cap segments 15,16.

To facilitate translation of the filter cartridge 20 along the core assembly 22, the inner diameter of the filter element 21 is preferably equal to the inner diameter of each outer end cap segment 13,14 where it is fixed to the outer end cap segment 13,14. Further, the outer diameter of the core 23 is preferably equal to the outer diameter of each inner end cap segment 15,16 where it is fixed to the inner end cap segment 15,16. To avoid abrasion of the O-ring 30 in the upper outer end cap segment 13 as the filter cartridge 20 slides along the core assembly 22, the inner diameter of the O-ring 30 is preferably larger than the outer diameter of the core 23. The inner diameter of the O-ring 30 in the lower outer end cap segment 14 may be smaller than or substantially equal to the outer diameter of the core 23.

Figure 2:
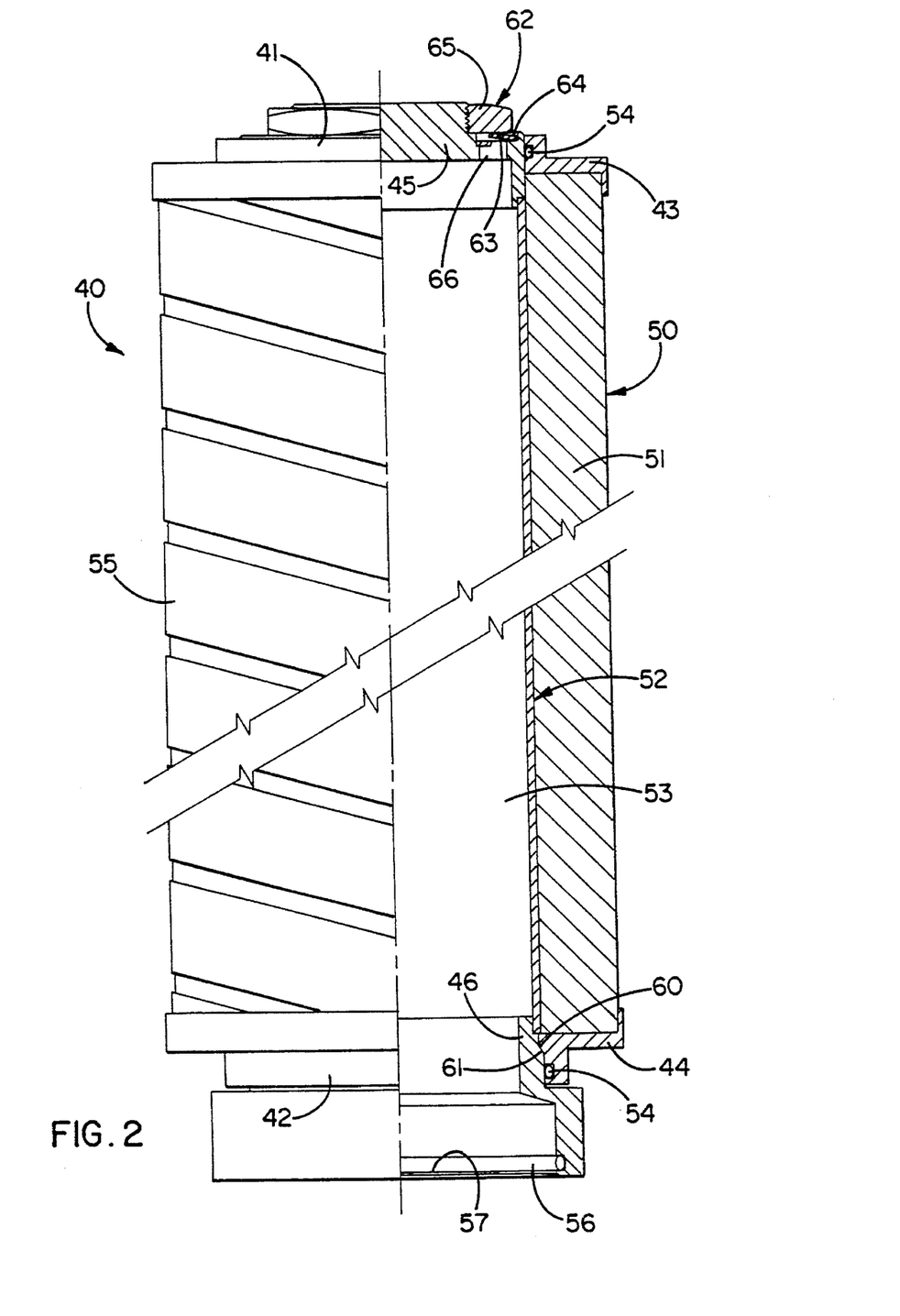
FIG. 2 is a partially sectional elevation view of another embodiment of the invention.

A second filter assembly 40 embodying the present invention is shown in FIG. 2. This embodiment is similar to the embodiment of FIG. 1. The second filter assembly 40 comprises upper and lower segmented end caps 41,42, each including inner and outer end cap segments 43,44, 45,46. The second filter assembly 40 also comprises a filter cartridge 50 which has a filter element 51 connected at its ends to the outer end cap segments 43,44, and a core assembly 52, which has a perforated core 53 attached at its ends to the inner end cap segments 45,46. Further, the outer and inner end cap segments 43,45; 44,46 of each end cap 41,42 are sealed to each other, e.g., by means of an O-ring 54 in each outer end cap segment 43,44.

There are, however, differences between the filter assembly 40 of FIG. 2 and the filter assembly 10 of FIG. 1. For example, the upper inner end cap segment 45 is blind while the lower inner end cap segment 46 defines an opening through which filtrate flows. In the illustrated embodiment, the inner periphery of an expanded lower portion of the lower inner end cap segment 46 includes an O-ring 56 contained in a groove 57. The core assembly 52 may thus be removably sealed to a housing nipple (not shown) by slipping the lower inner end cap segment 46 over the nipple in a manner similar to the first embodiment.

Also, although the outer end cap segments 43,44 of both end caps 41,42 are sealed to the inner end cap segments 45,46, only one of the end caps, e.g., the lower end cap 42, includes axially engaging shoulders 60,61 on the outer and inner end cap segments 44,46. In the second filter assembly 40, the filter cartridge 50 is mounted to the core assembly 52 by sliding the filter cartridge 50 over the upper inner end cap segment 45 and down along the core 53. The axial engagement of the shoulders 60,61 serves as a stop, limiting the downward axial movement of the filter cartridge 50 and ensuring its proper placement on the core assembly 52. Downwardly directed axial forces are transferred from the filter element 51 to the core 53 via the axially engaging shoulders 60,61 of the lower end cap 42 and the frictional engagement between the O-ring 54 of the upper outer end cap segment 43 and the outer periphery of the upper inner end cap segment 45 of the upper end cap 41. The filter element 51 is thus supported by the core assembly 52 against downwardly directed axial forces and prevented from buckling and collapsing downwardly along the core 53.

Further, the filter element 51 is provided with a wrap 55 to enhance the resistance of the filter element 51 against axially directed forces. For example, the hoop strength of the wrap 55 may enable the filter element 51 to better resist buckling and collapse. The wrap 55 may comprise one or more strips wrapped at least once around the filter element 51 and may be bonded to the filter element 51 and/or the outer end cap segments 43,44. In the illustrated embodiment, the wrap 55 comprises at least one strip wrapped helically several times around the filter element 51 and along the entire length of the elongate filter element 51. The wrap 55 is preferably a strip of porous, non-woven, polymeric fibrous material, such as that available from Intertech Group, Inc. under the trade designation Reemay. However, the wrap may be formed from any suitable material which will enhance the structural integrity of the filter element 51 and increase resistance to axially directed forces. In addition, the wrap may serve to protect and support the filter element during manufacture, installation and maintenance.

In addition, the end caps 41,42 of the second filter assembly 40 preferably include a condition responsive mechanism. The condition responsive mechanism may be any suitable mechanism for responding to a condition of the fluid being filtered, including a temperature sensitive bypass mechanism such as that depicted and described in U.S. Pat. No. 4,783,271. Further, the condition responsive mechanism may be incorporated in either or both end caps, including any of the end cap segments. However, the condition responsive mechanism is preferably incorporated in the inner end cap segments associated with the reusable core assembly.

In the illustrated filter assembly 40, the condition responsive mechanism comprises a pressure sensitive bypass mechanism 62 preferably incorporated in the upper inner end cap segment 45. The pressure sensitive bypass mechanism 62 may include a pressure sensitive element such as a Belleville washer 63 which is disposed in an annular groove 64 in the inner end cap segment 45. The Belleville washer 63 may angle upwardly to seal against the lower surface of an retaining/adjusting nut 65 which is threaded to a threaded portion of the upper inner end cap segment 45. When the pressure of the fluid outside of the filter assembly 40 exceeds the deformation strength of the Belleville washer 63, the fluid forces the inner edge of the Belleville washer 63 away from the lower surface of the nut 65. By tightening the nut 65 against the Belleville washer 63, the pressure at which the Belleville washer is deformed may be varied. Once the inner edge of the Belleville washer 63 moves away from the lower surface of the nut 65, the pressurized fluid passes through the gap between the washer and the nut, through perforations 66 in the upper inner end cap segment 45, and into the interior of the core 53. Thus, the fluid bypasses the filter element 51 without being filtered. When the fluid pressure falls to the extent that it no longer exceeds the deformation strength of the Belleville washer 63, the inner edge of the Belleville washer 63 seals against the lower surface of the nut 65, thereby preventing bypass of the filter element 51. Clearly, the inclusion of a bypass element in the filter assembly is particularly desirable for filtration applications in which circulation of the fluid must be maintained even at the expense of filtration.

Although the present invention has been described in terms of particular embodiments, it is not limited to these embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention defined in the claims.

What is claimed:

1. A filter assembly comprising:
   a perforated core having first and second ends;
   a hollow filter element removably mounted around the perforated core and having first and second ends; and
   a first end cap having a first segment attached to the first end of the filter element and a second segment attached to the first end of the core and a second end cap having a first segment attached to the second end of the filter element and a second segment attached to the second end of the core, wherein the first and second segments of each end cap are detachably sealed to each other.

2. The filter assembly of claim 1 further comprising first and second sealing members disposed between the first and second segments of the first and second end caps, respectively.

3. The filter assembly of claim 2 wherein the first segment of each end cap has an inner periphery and wherein the second segment of each end cap has an outer periphery which conforms to the inner periphery of the corresponding first segment and wherein the first and second sealing members comprise O-rings.

4. The filter assembly of claim 3, wherein the outer periphery of the second segment of at least one endcap includes a large diameter portion, a smaller diameter portion, and a shoulder between them, wherein the inner periphery of the first segment of the endcap includes a large diameter portion, a smaller diameter portion, and a shoulder between them, and wherein the shoulders of the first and second segments of the endcap are axially engaged.

5. The filter assembly of claim 4, wherein the second segment shoulder and the first segment shoulder are tapered.

6. The filter assembly of claim 3, wherein the hollow filter element has an inner diameter substantially equal to the inner diameter of the first segment of each endcap where it is fixed to the first segment of the endcap and the perforated core has an outer diameter substantially equal to the outer diameter of the second segment of each endcap where it is fixed to the second segment of the endcap, thereby facilitating movement of the hollow filter element along the perforated core.

7. The filter assembly of claim 3, wherein the second segment of the first endcap has an inner periphery defining an opening therein for the entry or discharge of fluid.

8. The filter assembly of claim 7, wherein the second segment of the second endcap is blind and blocks fluid flow.

9. The filter assembly of claim 3, wherein the second segment of each of the endcaps has an inner periphery defining an opening therein for the entry or discharge of fluid.

10. The filter assembly of claim 2 wherein the core has an outer diameter and wherein the first sealing member is mounted to the first segment of the first end cap and has an inner diameter which is larger than the outer diameter of the core.

11. The filter assembly of claim 10 wherein the second sealing member is mounted to the first segment of the second end cap and has an inner diameter which is smaller than the outer diameter of the core.

12. The filter assembly of claim 10 wherein the second sealing member is mounted to the first segment of the second end cap and has an inner diameter which is substantially equal to the outer diameter of the core.

13. The filter assembly of claim 2, wherein each sealing member comprises an O-ring and each O-ring is positioned within a groove on an inner periphery of the first segment of the endcap, the O-rings providing for a fluid tight seal between the filter element and the perforated core.

14. The filter assembly of claim 2:
   wherein the second segment of at least one endcap has an outer periphery which includes a large diameter portion, a smaller diameter portion, and a shoulder between them; the first segment of the endcap has an inner periphery which includes a large diameter portion, a smaller diameter portion, and a shoulder between them; and the outer periphery of the second segment conforms to the inner periphery of the first segment and the shoulders of the first and second segments of the endcap are axially engaged;
   wherein the first segment of each endcap defines an opening, the second segment of the endcap is disposed within the opening, and the sealing member is disposed between the outer periphery of the second segment and the inner periphery of the first segment;
   wherein the second segment of the first endcap or the second endcap has an inner periphery defining an opening therein for the entry or discharge of fluid; and
   wherein the filter assembly further comprises a wrap having one or more strips wrapped at least once around the filter element, the wrap having a hoop strength which resists buckling and collapse of the filter element in response to forces directed axially along the filter element.

15. The filter assembly of claim 14:
   wherein the shoulder of each segment is tapered;
   wherein each sealing member comprises an O-ring and at least one of the O-rings has an inner diameter larger than the outer diameter of the perforated core;

wherein the hollow filter element has an inner diameter substantially equal to the inner diameter of the first segment of each endcap where it is fixed to the first segment of each endcap and the perforated core has an outer diameter substantially equal to the outer diameter of the second segment of each endcap where it is fixed to the second segment of each endcap; and wherein the wrap comprises a strip helically wound around the filter element and along the entire length of the filter element, the strip comprising a porous, non-woven, polymeric fibrous material.

16. The filter assembly of claim 1, further comprising a wrap having one or more strips wrapped at least once around the filter element, the wrap having a hoop strength which resists buckling and collapse of the filter element in response to forces directed axially along the filter element.

17. The filter assembly of claim 16, wherein the wrap comprises a strip helically wound around the filter element and along the entire length of the filter element.

18. The filter assembly of claim 17, wherein the strip comprises a porous, non-woven, polymeric fibrous material.

19. The filter assembly of claim 1 further comprising a condition responsive mechanism coupled to a second segment of at least one of the end caps.

20. The filter assembly of claim 19 wherein the condition responsive mechanism comprises a pressure sensitive bypass mechanism.

21. The filter assembly of claim 1 further comprising a condition responsive mechanism coupled to at least one of the end caps.

22. The filter assembly of claim 1, wherein the first segment of each endcap defines an opening and the second segment of the endcap is disposed within the opening and sealed to the first segment by a sealing member.

23. The filter assembly of claim 1, wherein the perforated core and the hollow filter element have a generally cylindrical configuration.

24. A filter assembly comprising:

a filter cartridge including a hollow filter element having first and second ends and first and second impervious adapters capping the first and second ends of the filter element; and a core assembly including a perforated core disposed within the hollow filter element and having first and second ends and first and second adapters attached to the first and second ends of the perforated core, wherein the first and second adapters of the filter cartridge are sealed to the first and second adapters of the core assembly, respectively, and wherein the filter cartridge is removably mounted to the core assembly.

25. The filter assembly of claim 21, wherein the first and second adapters of the filter cartridge each define an opening, the first and second adaptors of the core assembly are respectively disposed in the openings of the first and second adaptors of the filter cartridge, and the filter assembly further comprises a first sealing member disposed between the first adaptors and a second sealing member disposed between the second adaptors.

26. The filter assembly of claim 25:

wherein the first adaptor of the core assembly has an outer periphery which includes a large diameter portion, a smaller diameter portion, and a shoulder between them;

wherein the first adaptor of the filter cartridge has an inner periphery which includes a large diameter portion, a smaller diameter portion, and a shoulder between them; and wherein the outer periphery of the first adaptor of the core assembly conforms to the inner periphery of the first adaptor of the filter cartridge and the shoulders of the first adaptors are axially engaged.

27. The filter assembly of claim 26, further comprising a wrap having one or more strips wrapped at least once around the filter element, the wrap having a hoop strength which resists buckling and collapse of the filter element in response to forces directed axially along the filter element.

28. The filter assembly of claim 27, wherein at least one of the sealing members has an inner diameter greater than the outer diameter of the perforated core.

29. The filter assembly of claim 26, wherein at least one of the sealing members have an inner diameter greater than the outer diameter of the perforated core.

30. The filter assembly of claim 25, further comprising a wrap having one or more strips wrapped at least once around the filter element, the wrap having a hoop strength which resists buckling and collapse of the filter element in response to forces directed axially along the filter element.

31. The filter assembly of claim 30, wherein at least one of the sealing members has an inner diameter greater than the outer diameter of the perforated core.

32. The filter assembly of claim 25, wherein at least one of the sealing members has an inner diameter greater than the outer diameter of the perforated core.

33. The filter assembly of claim 24:

wherein the first adaptor of the core assembly has an outer periphery which includes a large diameter portion, a smaller diameter portion, and a shoulder between them;

wherein the first adaptor of the filter cartridge has an inner periphery which includes a large diameter portion, a smaller diameter portion, and a shoulder between them;

wherein the outer periphery of the first adaptor of the core assembly conforms to the inner periphery of the first adaptor of the filter cartridge and the shoulders of the first adaptors are axially engaged; and wherein the filter assembly further comprises a wrap having one or more strips wrapped at least once around the filter element, the wrap having a hoop strength which resists buckling and collapse of the filter element in response to forces directed axially along the filter element.

34. The filter assembly of claim 33, further comprising a first sealing member disposed between the first adaptors and a second sealing member disposed between the second adaptors, at least one of the sealing members having an inner diameter greater than the outer diameter of the perforated core.

35. The filter assembly of claim 24:

wherein the first adaptor of the core assembly has an outer periphery which includes a large diameter portion, a smaller diameter portion, and a shoulder between them; the first adaptor of the filter cartridge has an inner periphery which includes a large diameter portion, a smaller diameter portion, and a shoulder between them; and the outer periphery of the first adaptor of the core assembly conforms to the inner periphery of the first adaptor of the filter cartridge and the shoulders of the first adaptors are axially engaged; and wherein the filter assembly further includes a first sealing member disposed between the first adaptors and a second sealing member disposed between the second adaptors, at least one of the sealing members having an inner diameter greater than the outer diameter of the perforated core.

36. The filter assembly of claim 24, further comprising a wrap having one or more strips wrapped at least once around the filter element, the wrap having a hoop strength which resists buckling and collapse of the filter element in response to forces directed axially along the filter element, a first sealing member disposed between the first adaptors, and a second sealing member disposed between the second adaptors, at least one of the sealing members having an inner diameter greater than the outer diameter of the perforated core.

37. The filter assembly of claim 24, wherein the first adaptor of the core assembly has an outer periphery which includes a large diameter portion, a smaller diameter portion, and a shoulder between them; the first adaptor of the filter cartridge has an inner periphery which includes a large diameter portion, a smaller diameter portion, and a shoulder between them; and the outer periphery of the first adaptor of the core assembly conforms to the inner periphery of the first adaptor of the filter cartridge and the shoulders of the first adaptors are axially engaged.

38. A filter assembly comprising:

a perforated core having first and second ends;

a hollow filter element removably mounted around the perforated core and having first and second ends; and a first end cap having a first segment attached to the first end of the filter element and a second segment attached to the first end of the perforated core and a second end cap having a first segment attached to the second end of the filter element and a second segment attached to the second end of the core, wherein the first and second segments of each end cap respectively include first and second shoulders which are arranged to axially engage each other and wherein the first and second segments of at least one of the end caps are detachably sealed to each other.

39. The filter assembly of claim 38 wherein the second segment of the first endcap has an outer periphery which includes a large diameter portion and a small diameter portion and the second shoulder is disposed between them; the first segment of the first endcap has an inner periphery which includes a large diameter portion and a smaller diameter portion and the first shoulder is disposed between them; and the outer periphery of the second segment of the first endcap conforms to the inner periphery of the first segment of the first endcap.

40. The filter assembly of claim 39 wherein the shoulders of at least one of the endcaps are tapered.

41. The filter assembly of claim 40 further comprising a first sealing member disposed between the first and second segments of the first endcap and a second sealing member disposed between the first and second segments of the second endcap, at least one of the first and second sealing members having an inner diameter greater than the outer diameter of the perforated core.

42. The filter assembly of claim 39 wherein the filter assembly further comprises a wrap having one or more strips wrapped at least once around the filter element, the wrap having a hoop strength which resists buckling and collapse of the filter element in response to forces directed axially along the filter element;

wherein the filter assembly further comprises a first sealing member disposed between the first and second segments of the first endcap and a second sealing member disposed between the first and second segments of the second endcap, at least one of the sealing members having an inner diameter greater than the outer diameter of the perforated core; and wherein the first segment of each endcap defines an opening, the second segment of the endcap is disposed within the opening, and the sealing member is disposed between an outer periphery of the second segment and an inner periphery of the first segment.

43. The filter assembly of claim 42:

wherein the shoulders of at least one endcap are tapered;

wherein the hollow filter element has an inner diameter substantially equal to the inner diameter of the first segment of each endcap where it is fixed to the first segment of each endcap and the perforated core has an outer diameter substantially equal to the outer diameter of the second segment of each endcap where it is fixed to the second segment of each endcap; and wherein the wrap comprises a strip helically wound around the filter element and along the entire length of the filter element, the strip comprising a porous, non-woven, polymeric fibrous material.

44. The filter assembly of claim 39 wherein the second segment of the second endcap has an outer periphery which includes a large diameter portion and a smaller diameter portion and the second shoulder is disposed between them; the first segment of the second endcap has an inner periphery which includes a large diameter portion and a smaller diameter portion and the first shoulder is disposed between them; and the outer periphery of the second segment of the second endcap conforms to the inner periphery of the first segment of the second endcap.

45. The filter assembly of claim 38, further comprising a wrap having one or more strips wrapped at least once around the filter element, the wrap having a hoop strength which resists buckling and collapse of the filter element in response to forces directed axially along the filter element.

46. The filter assembly of claim 45, wherein the wrap comprises a strip helically wound around the filter element and along the entire length of the filter element.

47. The filter assembly of claim 46, wherein the strip comprises a porous, non-woven, polymeric fibrous material.

48. The filter assembly of claim 38 further comprising a wrap including one or more strips wrapped at least once around the filter element.

49. The filter assembly of claim 48 wherein the wrap comprises at least one porous, non-woven strip of polymeric material helically wrapped around the filter element along the entire length of the filter element.

50. The filter assembly of claim 38 further comprising a condition responsive mechanism coupled to the second segment of at least one of the end caps.

51. The filter assembly of claim 50 wherein the condition responsive mechanism comprises a pressure sensitive bypass mechanism.

52. The filter assembly of claim 38, wherein the second segment of the first endcap has an inner periphery defining an opening therein for the entry or discharge of fluid.

53. The filter assembly of claim 52, wherein the second segment of the second endcap is blind and blocks fluid flow.

54. The filter assembly of claim 38 further comprising a condition responsive mechanism coupled to at least one of the end caps.

55. The filter assembly of claim 38, wherein the first segment of each endcap defines an opening and the second segment of the endcap is disposed within the opening and sealed to the first segment by a sealing member.

56. The filter assembly of claim 38, further comprising a sealing member disposed between the first and second segments of at least one endcap, the sealing member having an inner diameter greater than the outer diameter of the perforated core.

57. A filter assembly comprising:

a filter cartridge including a hollow filter element having first and second ends and first and second impervious adaptors capping the first and second ends of the filter element; and a core assembly including a perforated core disposed within the hollow filter element and having first and second ends and first and second adaptors attached to the first and second ends of the perforated core, wherein the first adaptor of the filter cartridge has a shoulder which is arranged to axially engage a shoulder on the first adaptor of the core assembly and the second adaptor of the filter cartridge has a shoulder which is arranged to axially engage a shoulder on the second adaptor of the core assembly, wherein the adaptors at at least one end of the filter assembly are detachably sealed to each other, and wherein the filter cartridge is removably mounted to the core assembly.

58. The filter assembly of claim 57, wherein the first and second adapters of the filter cartridge each define an opening, the first and second adaptors of the core assembly are respectively disposed in the openings of the first and second adaptors of the filter cartridge, and the filter assembly further comprises a first sealing member disposed between the first adaptors and a second sealing member disposed between the second adaptors.

59. The filter assembly of claim 58:

wherein the first adaptor of the core assembly has an outer periphery which includes a large diameter portion and a smaller diameter portion and the shoulder is disposed between them;

wherein the first adaptor of the filter cartridge has an inner periphery which includes a large diameter portion and a smaller diameter portion and the shoulder is disposed between them; and wherein the outer periphery of the first adaptor of the core assembly conforms to the inner periphery of the first adaptor of the filter cartridge.

60. The filter assembly of claim 59, further comprising a wrap having one or more strips wrapped at least once around the filter element, the wrap having a hoop strength which resists buckling and collapse of the filter element in response to forces directed axially along the filter element.

61. The filter assembly of claim 60, wherein at least one of the sealing members has an inner diameter greater than the outer diameter of the perforated core.

62. The filter assembly of claim 59, wherein at least one of the sealing members has an inner diameter greater than the outer diameter of the perforated core.

63. The filter assembly of claim 58, further comprising a wrap having one or more strips wrapped at least once around the filter element, the wrap having a hoop strength which resists buckling and collapse of the filter element in response to forces directed axially along the filter element.

64. The filter assembly of claim 63, wherein at least one of the sealing members has an inner diameter greater than the outer diameter of the perforated core.

65. The filter assembly of claim 58, wherein at least one of the sealing members has an inner diameter greater than the outer diameter of the perforated core.

66. The filter assembly of claim 57:

wherein the first adaptor of the core assembly has an outer periphery which includes a large diameter portion and a smaller diameter portion and the shoulder is disposed between them;

wherein the first adaptor of the filter cartridge has an inner periphery which includes a large diameter portion and a smaller diameter portion and the shoulder is disposed between them;

wherein the outer periphery of the first adaptor of the core assembly conforms to the inner periphery of the first adaptor of the filter cartridge; and wherein the filter assembly further comprises a wrap having one or more strips wrapped at least once around the filter element, the wrap having a hoop strength which resists buckling and collapse of the filter element in response to forces directed axially along the filter element.

67. The filter assembly of claim 66, further comprising a first sealing member disposed between the first adaptors and a second sealing member disposed between the second adaptors, at least one of the sealing members having an inner diameter greater than the outer diameter of the perforated core.

68. The filter assembly of claim 57:

wherein the first adaptor of the core assembly has an outer periphery which includes a large diameter portion and a smaller diameter portion and the shoulder is disposed between them; the first adaptor of the filter cartridge has an inner periphery which includes a large diameter portion and a smaller diameter portion and the shoulder is disposed between them; and the outer periphery of the first adaptor of the core assembly conforms to the inner periphery of the first adaptor of the filter cartridge; and wherein the filter assembly further includes a first sealing member disposed between the first adaptors and a second sealing member disposed between the second adaptors, at least one of the sealing members having an inner diameter greater than the outer diameter of the perforated core.

69. The filter assembly of claim 57, further comprising a wrap having one or more strips wrapped at least once around the filter element, the wrap having a hoop strength which resists buckling and collapse of the filter element in response to forces directed axially along the filter element, a first sealing member disposed between the first adaptors, and a second sealing member disposed between the second adaptors, at least one of the sealing members having an inner diameter greater than the outer diameter of the perforated core.

70. The filter assembly of claim 57:

wherein the first adaptor of the core assembly has an outer periphery which includes a large diameter portion and a smaller diameter portion and the shoulder is disposed between them; the first adaptor of the filter cartridge has an inner periphery which includes a large diameter portion and a smaller diameter portion and the shoulder is disposed between them; and the outer periphery of the first adaptor of the core assembly conforms to the inner periphery of the first adaptor of the filter cartridge.

71. A filter assembly comprising:

a perforated core having a first end;

a hollow filter element removably mounted around the perforated core and having a first end; and an end cap having a first segment attached to the first end of the filter element and a second segment attached to the first end of the core, each segment including a first portion having a first diameter, a second portion having a second diameter, and a shoulder between the first and second portion, wherein the first and second portions of the second segment are positioned within the first and second portions, respectively, of the first segment and the shoulders of the first and second segments about each other.

72. The filter assembly of claim 71 further comprising a wrap including at least one strip wrapped at least once around the filter element, the wrap having a hoop strength which resists buckling and collapse of the filter element in response to forces directed axially along the filter element.

73. The filter assembly of claim 72, wherein the wrap comprises at least one porous, non-woven strip of polymeric fibrous material helically wrapped around the filter element along the entire length of the filter element.

74. The filter assembly of claim 71 further comprising a condition responsive mechanism coupled to the second segment of the end cap.

75. The filter assembly of claim 74, the condition responsive mechanism comprises a pressure sensitive bypass mechanism.

76. The filter assembly of claim 71 further comprising a second end cap having a first segment attached to a second end of the filter element and a second segment attached to a second end of the core, each segment of the second end cap including a first portion having a first diameter, a second portion having a second diameter, and a shoulder between the first and second portion, wherein the first and second portions of the second segment are positioned within the first and second portions, respectively, of the first segment and the shoulders of the first and second segments abut each other.

77. The filter assembly of claim 76, wherein the second segment of at least one of the endcaps has an inner periphery defining an opening therein for the entry or discharge of fluid.

78. The filter assembly of claim 71 wherein the shoulders of the first and second segments are tapered.

79. The filter assembly of claim 71 further comprising a sealing member disposed between the first and second segments of the endcap, the sealing member has an inner diameter greater than the outer diameter of the perforated core.

80. The filter assembly of claim 71 further comprising a condition responsive mechanism coupled to the end cap.

81. The filter assembly of claim 71, wherein the second segment of the endcap has an inner periphery defining an opening therein for the entry or discharge of fluid.

82. A filter assembly comprising:
a filter cartridge including a hollow filter element having a first end and an impervious adapter capping the first end of the filter element, the adapter including a first portion having a first diameter, a second portion having a second diameter, and a shoulder between the first and second portions; and
a core assembly including a perforated core disposed within the hollow filter element and having a first end and an adapter attached to the first end of the perforated core, the adapter including a first portion having a first diameter, a second portion having a second diameter, and a shoulder between the first and second portions, wherein the first and second portions of the core adapter are positioned within the first and second portions, respectively, of the filter element adapter and the shoulders of the adapters abut each other and wherein the filter cartridge is removably mounted to the core assembly.

83. The filter assembly of claim 82, wherein the impervious adaptor of the filter cartridge defines an opening, the adaptor of the core assembly is disposed in the opening of the impervious adaptor of the filter cartridge, and the filter assembly further comprises a sealing member disposed between the adaptor of the core assembly and the impervious adaptor of the filter cartridge.

84. The filter assembly of claim 83, wherein the sealing member has an inner diameter greater than the outer diameter of the perforated core.

85. The filter assembly of claim 82, further comprising a wrap having one or more strips wrapped at least once around the filter element, the wrap having a hoop strength which resists buckling and collapse of the filter element in response to forces directed axially along the filter element.

86. The filter assembly of claim 85, wherein the wrap comprises at least one porous, non-woven strip of polymeric fibrous material helically wrapped around the filter element along the entire length of the filter element.

87. The filter assembly of claim 82, wherein the outer periphery of the adaptor of the core assembly conforms to the inner periphery of the impervious adaptor of the filter cartridge.

88. The filter assembly of claim 82 further comprising:
a second impervious adaptor capping a second end of the filter element, the second impervious adaptor including a first portion having a first diameter, a second portion having a second diameter, and a shoulder between the first and second portions; and
a second adaptor capping a second end of the perforated core, the second impervious adaptor including a first portion having a first diameter, a second portion having a second diameter, and a shoulder between the first and second portions, wherein the first and second portions of the second impervious adaptor of the core positioned within the first and second portions, respectively, of the second impervious adaptor of the filter element and the shoulders of the adaptors of the filter elements and the shoulders of the adaptors abut each other and wherein the filter cartridge is removably mounted to the core assembly.

89. The filter assembly of claim 82, wherein the shoulder of the impervious adaptor capping the first end of the filter element and the shoulder of the adaptor capping the first end of perforated core are tapered.

* * * * *

UNITED STATES PATENT AND TRADEMARK OFFICE
CERTIFICATE OF CORRECTION

PATENT NO.    :    5,476,585
DATED         :    December 19, 1995
INVENTOR(S)   :    Mills It is certified that error appears in the above-indentified patent and that said Letters Patent is hereby corrected as shown below:

Column 15, Line 8, change "about" to --abut--.

Signed and Sealed this

Sixteenth Day of July, 1996

Attest:

BRUCE LEHMAN

Attesting Officer    Commissioner of Patents and Trademarks